United States Patent
Iwamoto et al.

(10) Patent No.: US 10,503,546 B2
(45) Date of Patent: Dec. 10, 2019

(54) GPU RESOURCE PRIORITIES BASED ON HARDWARE UTILIZATION

(71) Applicant: Apple Inc., Cupertino, CA (US)

(72) Inventors: Tatsuya Iwamoto, Foster City, CA (US); Kutty Banerjee, San Jose, CA (US); Benjiman L. Goodman, Cedar Park, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 15/615,412

(22) Filed: Jun. 6, 2017

(65) Prior Publication Data

US 2018/0349146 A1    Dec. 6, 2018

Related U.S. Application Data

(60) Provisional application No. 62/514,710, filed on Jun. 2, 2017.

(51) Int. Cl.
  *G06F 9/48* (2006.01)
  *G06F 9/46* (2006.01)

(52) U.S. Cl.
  CPC ............ *G06F 9/4881* (2013.01); *G06F 9/461* (2013.01)

(58) Field of Classification Search
  None
  See application file for complete search history.

(56) References Cited

U.S. PATENT DOCUMENTS 7,676,578 B1 * 3/2010 Zhu ................... G06F 11/3409
                                                              370/232
7,737,983 B2   6/2010 Brothers
                    (Continued)

FOREIGN PATENT DOCUMENTS

| CN | 102597950 B | 7/2012 |
| CN | 107209736 A | 9/2017 |

OTHER PUBLICATIONS

James L. Ginter (1974) ,"The Effects of Normalization on the Multi-Attribute Attitude Model", in NA—Advances in Consumer Research vol. 01, eds. Scott Ward and Peter Wright, Ann Abor, MI : Association for Consumer Research vol. 1, 1974 pp. 302-309. (Year: 1974).*

*Primary Examiner* — Meng Ai T An
*Assistant Examiner* — Zujia Xu
(74) *Attorney, Agent, or Firm* — Blank Rome LLP

(57) ABSTRACT

In general, techniques are disclosed for tracking and allocating graphics processor hardware over specified periods of time. More particularly, hardware sensors may be used to determine the utilization of graphics processor hardware after each of a number of specified intervals (referred to as "sample intervals"). The utilization values so captured may be combined after a first number of sample intervals (the combined interval referred to as an "epoch interval") and used to determine a normalized utilization of the graphic processor's hardware resources. Normalized epoch utilization values have been adjusted to account for resources used by concurrently executing processes. In some embodiments, a lower priority process that obtains and fails to release resources that should be allocated to one or more higher priority processes may be detected, paused, and its hardware resources given to the higher priority processes.

18 Claims, 10 Drawing Sheets

(56) References Cited

U.S. PATENT DOCUMENTS

| | | | |
|---|---|---|---|
| 8,730,248 B2 | 5/2014 | Sasaki | |
| 9,535,815 B2 | 1/2017 | Smith | |
| 9,594,560 B2 | 3/2017 | Ananthakrishnan | |
| 9,626,295 B2 | 4/2017 | Park | |
| 2005/0028160 A1* | 2/2005 | Cofer | G06F 9/4881 718/100 |
| 2009/0025004 A1* | 1/2009 | Barnard | G06F 9/50 718/104 |
| 2013/0030785 A1* | 1/2013 | Satterfield | G06Q 10/06 703/21 |
| 2015/0234450 A1* | 8/2015 | Lin | G06F 1/3293 713/323 |
| 2017/0256018 A1 | 9/2017 | Gandhi | |
| 2017/0357531 A1* | 12/2017 | Zhang | G06F 9/5005 |
| 2018/0011792 A1* | 1/2018 | Koker | G06F 12/0804 |
| 2018/0109469 A1* | 4/2018 | Nakazawa | H04L 47/821 |

* cited by examiner

GPU RESOURCE PRIORITIES BASED ON HARDWARE UTILIZATION

BACKGROUND

This disclosure relates generally to the tracking of resources for a graphics processing unit (GPU). More particularly, but not by way of limitation, this disclosure relates to a technique for the utilization of hardware to track the execution of fine-grained amounts of work on a GPU.

One goal for managing hardware resources of computing devices such as a GPU, is utilizing as much of the computing device as much of the time as possible. One approach to increasing a computing device's hardware utilization is to simultaneously execute multiple processes in parallel and dynamically allocate the hardware resources between them. In many cases, the underlying hardware resources may not be able to be allocated at a fine enough granularity to match a requested division of resources; possibly causing the starvation of one or more processes (e.g., one or more lower priority processes). In addition, software systems issuing or generating such requests are often unable to detect when the underlying hardware resources have been allocated differently from that requested. Each of these situations can result in hardware utilizations being sub-optimal.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a method to measure and allocate a graphic processors' hardware resources (e.g., registers, computational circuits such as shaders, etc.). The method includes measuring, for a first process, a first utilization value for first hardware resources of the graphics processor after each of a first plurality of sample time intervals, wherein each first utilization value is indicative of the first process' use of the first hardware resources during each of the corresponding sample time intervals; measuring, for at least one second process, a second utilization value for second hardware resources of the graphics processor after each of the sample time intervals, wherein each second utilization value is indicative of the at least one second process' use of the second hardware resources during each of the corresponding sample time intervals; combining, after the first plurality of sample time intervals (e.g., after an epoch time interval), the first utilization values to generate a first combined utilization value for the first process; combining, after the first plurality of sample time intervals (e.g., after the epoch time interval), the second utilization values for each of the at least one second processes to generate a second combined utilization value for each of the at least one second processes; normalizing the first combined utilization value, based on the first combined utilization value and each of the at least one second combined utilization values, to generate a normalized first utilization value; using the normalized first utilization value to modify a first priority of the first process; and allocating hardware resources to the first process based on the modified first priority. In one or more embodiments, the "first plurality of sample time intervals" comprise a specified number of sample time intervals. In another embodiment, measuring the first utilization value and each second utilization value comprises obtaining output from a hardware resource utilization sensor. In one embodiment, normalizing the first (second) combined utilization value comprises normalizing the first (second) combined utilization value based on the sum of the first combined utilization value and the second combined utilization value for each of the at least one second processes. In still one or more other embodiments, the method further includes determining a third process has a higher priority than the first process, the third process blocked by execution of the first process; pausing the first process in response to determining the third process has a higher priority than the first process; releasing the first hardware resources from the first process congruent with pausing the first process; allocating third hardware resources of the GPU to the third process, wherein the third hardware resources include at least some of first hardware resources; executing the third process after allocating it the third hardware resources; and measuring, for the third process, a third utilization value (e.g., from a hardware resource utilization sensor) for the third hardware resources after each of a second plurality of sample time intervals (e.g., after an epoch time interval), wherein each third utilization value is indicative of the third process' use of the third hardware resources during each of the corresponding sample time intervals. In one or more other embodiments, the various methods described herein may be embodied in computer executable program code and stored in a non-transitory storage device. In yet another embodiment, the method may be implemented in an electronic device having a graphics processor.

Figure 1:
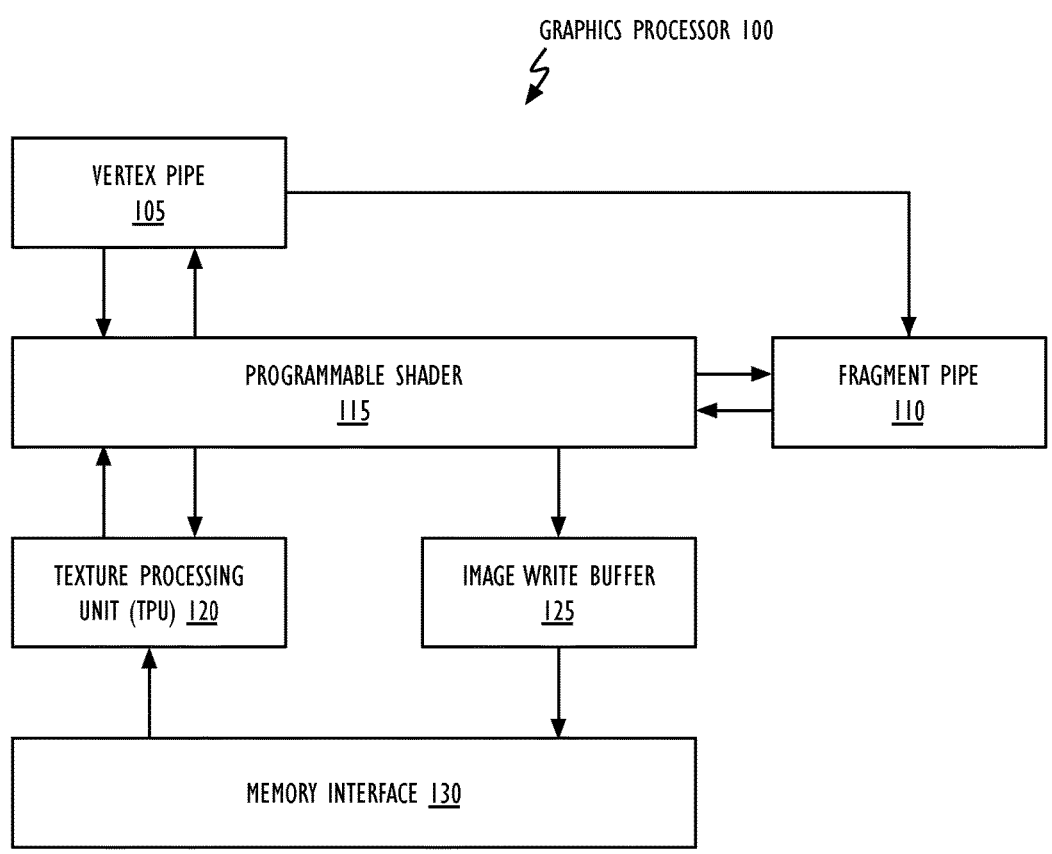
FIG. 1 is a block diagram illustrating one embodiment of a graphics processing unit that includes a processing circuit hardware resource allocation system.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An un-programmed field-programmable gate array (FPGA), for example, would not be considered to be "configured to" perform some specific function, although it may be "configurable to" perform that function after programming.

As used herein, the term "based on" is used to describe one or more factors that affect a determination. This term does not foreclose the possibility that additional factors may also affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose the situation in which the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose the situation in which the performance of A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processing circuit that includes six clusters, the terms "first cluster" and "second cluster" can be used to refer to any two of the six clusters, and not, for example, to two specific clusters (e.g., logical clusters 0 and 1).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

DETAILED DESCRIPTION

This disclosure pertains to systems, methods, and computer readable media to improve the operation of graphics systems. In general, techniques are disclosed for tracking and allocating graphics processor hardware over specified periods of time. More particularly, hardware resource utilization sensors may be used to determine the utilization of graphics processor hardware after each of a number of specified intervals (referred to as "sample intervals"). The utilization values so captured may be combined after a first number of sample intervals (the combined interval referred to as an "epoch interval") and used to determine a normalized utilization of the graphic processor's hardware resources. Normalized epoch utilization values are utilization values that have been adjusted to account for resources used by concurrently executing processes. In some embodiments, a lower priority task (e.g., a "kick" as described below) that obtains and fails to release resources that should be allocated to one or more higher priority tasks may be detected. In such cases, the lower priority task can be paused and its hardware resources removed so that higher priority tasks may execute. The lower priority task may be released to resume execution when, for example, the conditions that triggered the pause are resolved. There may also, in one or more embodiments, be time restrictions on how quickly a paused process may resume execution. The precise mechanism of a release operation may be dependent on the specific implementation.

Use of a processing circuit hardware resource allocation system is disclosed herein where hardware resources (e.g., vertex shaders, fragment shaders, united shader clusters, registers, or computational units) from a plurality of clusters (components or circuits hosting said resources) of a processing system (e.g., a graphics processor) may be distributed between a plurality of processes in an equitable fashion (e.g., based on a target quality of service (QoS) metric). In various embodiments, data for a plurality of processes may be received at some or all of the clusters from one or more process queues. At least one of the clusters may include one or more hardware resource utilization sensors, a hardware resource arbitration circuit, and a process priority list. The process priority list may store priorities for at least some of the processes. Based on these priorities and on hardware resource utilization sensor output over a first time period (e.g., an "epoch interval"), itself based on a number of smaller time periods (e.g., a "sample interval"), the hardware resource arbitration circuit may allocate the available hardware resources to the plurality of processes.

In one or more embodiments, the processing circuit hardware resource allocation system may further include one or more director circuits. Director circuits may receive current utilization information of a processes hardware resources and, in some cases, may adjust the processes priority. For example, a director circuit may receive the current utilization of various hardware resources at a plurality of clusters by a process (e.g., for a given sample interval). The director circuit may also include a utilization accumulation circuit that may be used to determine the processes utilization of its allocated hardware resources over a particular amount of time (e.g., a given epoch interval). In some embodiments a comparator circuit may be used to compare the current utilization (over a given epoch interval) to a target utilization. A process priority adjustment circuit may adjust a processes priority at a cluster based on this comparison by sending a priority signal to the cluster's priority list. Based on the adjusted priority, a different amount of hardware resources may be allocated to the processes during the ensuing particular amount of time (e.g., an epoch interval).

As a result, the disclosed processing circuit hardware resource allocation system can, in some cases, more accurately allocate hardware resources to processes over a given interval (e.g., an epoch interval) than can a system where resources are allocated once based on priorities or a system where resources are allocated using a purely software approach. While illustrative epoch intervals can vary from implementation to implementation, in one embodiment the epoch interval can vary between 500 nanoseconds (nsec) and 100 milliseconds (msec). In some cases, detecting that the hardware resources are not being utilized as expected may result in the system identifying one or more ill-behaved or hung processes.

Referring to FIG. 1, a simplified block diagram illustrating one embodiment of a graphics unit 100 is shown. In the illustrated embodiment, graphics unit 100 includes vertex pipe 105, fragment pipe 110, programmable shader 115, texture processing unit (TPU) 120, image write buffer 125, and memory interface 130. In some embodiments, graphics unit 100 may be configured to process both vertex and fragment data using programmable shader 115, which may be configured to process data (e.g., graphics data) in parallel using multiple execution pipelines or instances. In other embodiments, the multiple execution pipelines correspond to a plurality of execution units of a processing circuit hardware resource allocation system.

Vertex pipe 105 may include various fixed-function hardware configured to process vertex data. Vertex pipe 105 may be configured to communicate with programmable shader 115 to coordinate vertex processing, and to send processed data to fragment pipe 110 and/or programmable shader 115 for further processing. Fragment pipe 110 may include various fixed-function hardware configured to process pixel data. Fragment pipe 110 may be configured to communicate with programmable shader 115 in order to coordinate fragment processing. Fragment pipe 110 may also be configured to perform rasterization on polygons received from vertex pipe 105 and/or programmable shader 115 so as to generate fragment data. Vertex pipe 105 and/or fragment pipe 110 may be coupled to memory interface 130 (coupling not shown) in order to access graphics data. Programmable shader 115 may be configured to receive vertex data from vertex pipe 105 and fragment data from fragment pipe 110 and/or TPU 120. Programmable shader 115 may be further configured to perform vertex processing tasks on vertex data, including various transformations and/or adjustments of vertex data. By way of example, programmable shader 115 may also be configured to perform fragment processing tasks on pixel data such as texturing and shading. Programmable shader 115 may include multiple execution instances for processing data in parallel. In various embodiments, portions (e.g., execution units, registers, arithmetic logic units, memory locations, etc.) of programmable shader 115 may be usable by multiple processes (e.g., vertex processing tasks, compute processing tasks and fragment processing tasks). In practice, different portions of programmable shader 115 may be allocated to different processes during execution of those processes. Programmable shader 115 in one or more embodiments may be coupled in any of various appropriate configurations to other programmable and/or fixed-function elements in a graphics unit. The configuration shown in FIG. 1 is illustrative only. TPU 120 may be configured to schedule fragment processing tasks from programmable shader 115. In some embodiments, TPU 120 may be configured to pre-fetch texture data and assign initial colors to fragments for further processing by programmable shader 115 (e.g., via memory interface 130). In other embodiments, TPU 120 may be configured to provide fragment components in one or more normalized integer formats or one or more floating-point formats. In still other embodiments, TPU 120 may be configured to provide fragments in groups of four (a "fragment quad") in a 2×2 format to be processed by a group of four execution pipelines in programmable shader 115. Image write buffer 125 may be configured to store processed tiles of an image and may further perform final operations to a rendered image before it is transferred to a frame buffer (e.g., in a system memory via memory interface 130). Memory interface 130 may facilitate communication between graphics unit 100 and one or more of various memory hierarchies in various embodiments.

Figure 2:
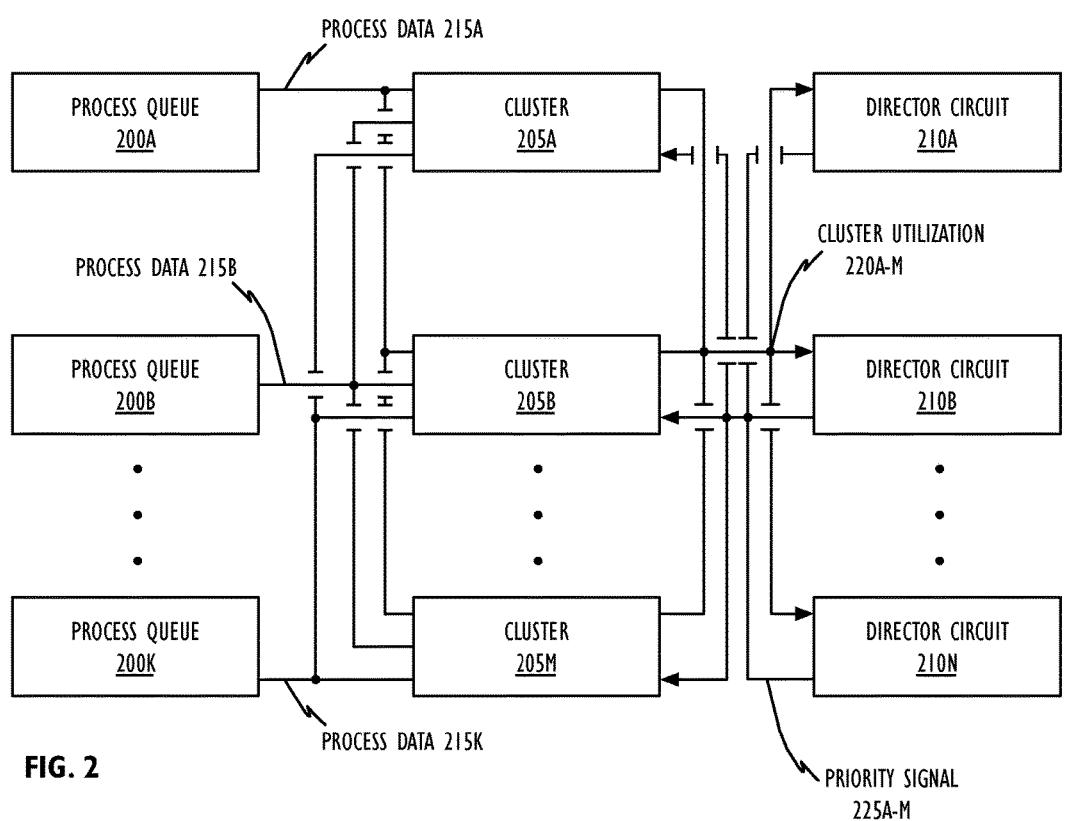
FIG. 2 is a block diagram illustrating one embodiment of devices that include a processing circuit hardware resource allocation system.

Referring to FIG. 2, in one or more embodiments process queues 200A-K, clusters 205A-M, and director circuits 210A-N are shown. Although process queues 200A-K, clusters 205A-M, and director circuits 210A-N are interconnected in a particular manner in FIG. 2, in other embodiments process queues 200A-K, clusters 205A-M, and director circuits 210A-N may be connected in other manners (e.g., process queue 200K may not be connected to cluster 205A). In various embodiments, different numbers of at least one of process queues 200A-K, clusters 205A-M, or director circuits 210A-N may be present. In various other embodiments, some or all of the elements shown in FIG. 2 may be part of one or more components of graphics unit 100.

Process queues 200A-K may store data for a plurality of respective processes and may provide the data to clusters 205A-M as process data 215A-K. Process data of a single process queue may be provided to a single cluster or to multiple clusters. Process data provided to multiple clusters may be the same or different. Additionally, multiple process queues may provide process data to a single cluster. For example, process queue 200A may provide a first portion of process data 215A to cluster 205A and a second portion of process data 215A to cluster 205M. Further, during a single execution cycle, process queue 200B may provide a first portion of process data 215B to cluster 205M and a second portion of process data 215B to cluster 205B. Process queues 200A-K may correspond to different functional aspects of the system. For example, in some embodiments, process queues 200A-K may correspond to various data master functions of a GPU (see discussion below). Processes may be allocated to process queues 200A-K based on the functions performed by the processes. In the illustrated embodiment, process data 215A includes data for only a single process. In some cases, the data may correspond to multiple threads of a single process. In other embodiments, process data 215A may include data for multiple processes. In still other embodiments, process queues 200A-K may be software queues. In other embodiments, process queues 200A-K may be hardware queues. In yet other embodiments, some of process queues 200A-K may be software queues while others may be hardware queues.

Clusters 205A-M may include hardware resources used to perform various computing actions using process data. As noted above, in some cases clusters 205A-M may receive process data from multiple processes. For example, cluster 205M may receive a portion of process data 215A and a portion of process data 215B. When process data corresponding to multiple processes is received, clusters 205A-M may allocate respective hardware resources to the processes based on priorities of the processes and the determined hardware utilization (see discussion below). In various embodiments, the priorities may be determined based on at least one of a process type, a priority requested by the process queue, or a queue from which the process is received. For example, processes relating to a user interface may have a specified range of priorities (e.g., at least one of a specified minimum priority, a specified maximum priority, or a specified initial priority). As another example, processes received from a vertex queue may also have a specified range of priorities. In some cases, the hardware resources of clusters 205A-M may not be utilized as indicated by the priorities. In accordance with one or more embodiments, clusters 205A-M may periodically indicate utilization of the hardware resources by the various processes to director circuits 210A-N via cluster utilizations 220A-M (e.g., based on utilization sensor output over one or more sample intervals and/or one or more epoch intervals). Cluster utilizations 220A-M may represent a utilization of hardware resources for a particular amount of time (e.g., an epoch interval) or may represent an instantaneous utilization of hardware resources. In response to cluster utilizations 220A-M, clusters 205A-M may receive priority signals 225A-M, which may modify one or more priorities at clusters 205A-M. Clusters 205A-M may reallocate the hardware resources based on the modified priorities. In some embodiments, the hardware resources may be reallocated to be within a specified range over a specified amount of time. As an example, in some embodiments, cluster 205A may include twenty registers and may further include requests from a first process and a second process. The priorities of the processes may indicate that the first process should receive eighty percent of the registers (sixteen registers) and the second process should receive twenty percent of the registers (four registers). However, the first process may be unable to proceed with fewer than ten registers and the second process may be unable to proceed with fewer than six registers. Because, in this example, the initially allocated four registers for the second process is insufficient for it to execute, cluster utilization 220A-M may indicate that the second process is not utilizing its allocated registers. In response, priority signals 225A-M may adjust the priorities so the second process is not allocated any of the registers half of the time and receives forty percent of the registers (eight registers) the other half of the time. Under this allocation, the first process receives 10 registers half the time and 20 registers the other half of the time while the second process receives 10 registers half the time and no registers the other half of the time. As a result, this adjustment may allow both processes to make progress.

Director circuits 210A-N may receive cluster utilizations 220A-M and may determine whether to adjust the priorities at clusters 205A-M. In particular, as described further below, director circuits 210A-N may determine, for a particular process, its actual utilization over a given time period (e.g., an instantaneous utilization, a utilization based on one or more sample intervals, or a utilization based on one or more epoch intervals). Based on a comparison between a target utilization and a current or actual utilization, one or more of director circuits 210A-N may adjust a priority of a process at one or more of clusters 205A-M. As a result, processes may receive an allocated amount of hardware resources over a window of time (i.e., interval). Additionally, director circuits 210A-N may detect that one or more processes are ill-behaved (e.g., requesting resources and failing to utilize them) or hung (e.g., failing to continue execution). In some cases, director circuits 210A-N may indicate, via priority signals 225A-M or via another signal, that a context switch should occur with regard to a process, removing the process from clusters 205A-M. In some embodiments, each director circuit 210A-N corresponds to a different process. Accordingly, where each of process queues 200A-K sends process data for a single process to one of clusters 205A-M at a time, director circuits 210 may correspond to different process queues 200.

Figure 3:
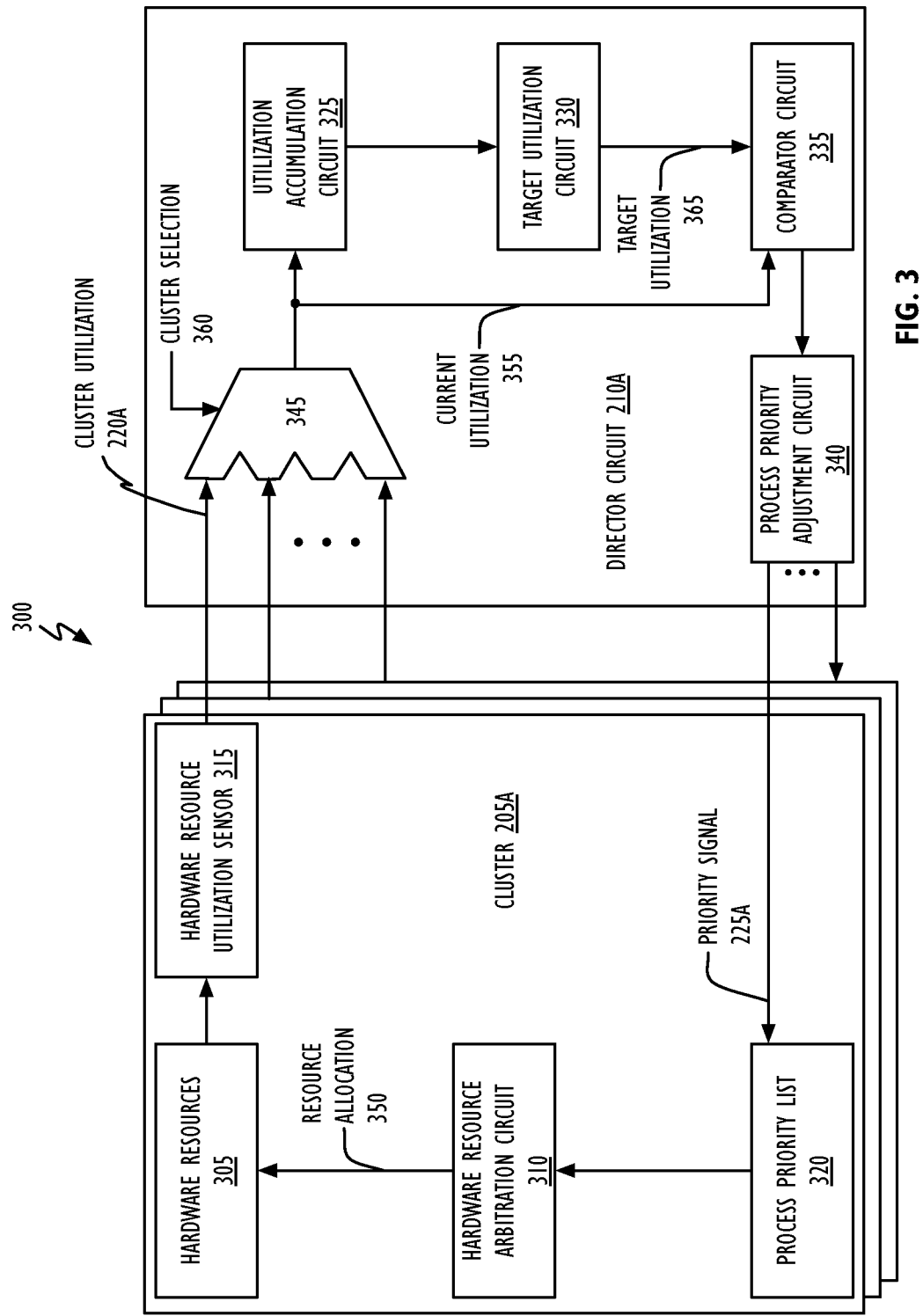
FIG. 3 is a block diagram illustrating one embodiment of a processing circuit hardware resource allocation system.

Referring to FIG. 3, processing circuit hardware resource allocation system 300 is shown in accordance with one or more embodiments. As discussed above, cluster 205A and director circuit 210A may be part of a larger processing system. However, for clarity's sake, various portions of a complete system are not shown. In the illustrated embodiment, cluster 205A includes hardware resources 305, hardware resource arbitration circuit 310, hardware utilization sensor 315, and process priority list 320. In the illustrated embodiment, director circuit 210A includes utilization accumulation circuit 325, target utilization circuit 330, comparator circuit 335, process priority adjustment circuit 340, and switching circuit 345. In some embodiments, cluster 205A may include multiple instances of hardware resource utilization sensor 315, corresponding to various director circuits. In another embodiment, rather than process priority adjustment circuit 340 communicating with multiple clusters, director circuit 210A may include multiple instances of process priority adjustment circuit 340. In some embodiments, clusters 205A-M, director circuits 210A-N, or both may not include various respective illustrated portions of cluster 205A and/or director circuit 210A. For example, target utilization circuit 330 may correspond to both director circuit 210A and director circuit 210B. In still other embodiments, each cluster 205 includes one or more hardware resource utilization sensors. In one embodiment, hardware resource utilization sensors 315 may comprise counters.

As described above, cluster 205A may receive process data from multiple processes. The processes may execute by utilizing hardware resources 305 (e.g., registers, execution units, logic units, cache entries, program state storage circuitry such as that used as a program counter, etc.). Processes may request more hardware resources than are available. Accordingly, hardware resource arbitration circuit 310 may, via resource allocation information 350, allocate hardware resources 305 between the processes based on priorities received from process priority list 320. Hardware resource utilization sensor 315 may monitor utilization of the allocated hardware resources 305 by one or more of the processes and may, in response thereto, generate cluster utilization 220A. Cluster utilization 220A may indicate a portion of the allocated hardware resources 305 that were actually utilized during a given time period (e.g., a sample interval). In some embodiments, some portions of hardware resources 305 (e.g., registers) may be weighted differently from other portions of hardware resources 305 (e.g., execution units). In the illustrated embodiment, hardware resource utilization sensor 315 may periodically send cluster utilization 220A to director circuit 210A (e.g., after every sample interval). Cluster utilization 220A may represent a utilization of hardware resources 305 over a specified amount of time (e.g., 1 millisecond, 1 second, or a lifetime of a corresponding process) or a utilization of hardware resources 305 at a specific time.

Also as described above, director circuit 210A may receive cluster utilization indications or information from a plurality of clusters. The cluster indications may indicate utilization of hardware resources by one or more processes at the respective cluster. In the illustrated embodiment, director circuit 210A may receive cluster utilization 220A at switching circuit 345. Switching circuit 345 may, in turn, output cluster utilizations as current utilization 355 based on cluster selection 360. In some embodiments, switching circuit 345 may comprise one or more multiplexers. Current utilization 355 may be sent to utilization accumulation circuit 325 and to comparator circuit 335. Utilization accumulation circuit 325 may determine the utilization of hardware resources (e.g., at clusters 205A-M) by a process over a particular amount of time (e.g., an epoch interval). In the illustrated embodiment, utilization accumulation circuit 325 may output an indication of the utilization of the hardware resources to target utilization circuit 330. Target utilization circuit 330 may use the utilization of the hardware resources to identify a target utilization 365 (i.e., for a particular cluster). By way of example, target utilization circuit 330 may indicate a target utilization of hardware resources 305 for a process monitored by hardware resource utilization sensor 315 when current utilization 355 corresponds to cluster utilization 220A. Target utilization 365 may indicate a number of resources to be given to the process during a next specified period of time (e.g., until target utilization 365 is recalculated for hardware resources 305). In some embodiments, target utilization circuit 330 may determine target utilization 365 based on a utilization of hardware resources by one or more other processes (e.g., received at cluster 205A from process queues other than the process corresponding to director circuit 210A). In other embodiments, target utilization circuit 330 may determine target utilization 365 by tracking a number of threads of the process that are consumed. In still other embodiments, one or more software components (e.g., executing at director circuit 210A or at one or more processors external to director circuit 210A) may be used to determine target utilization 365.

Comparator circuit 335 may compare current utilization 355 to target utilization 365 and may output a result to process priority adjustment circuit 340. Additionally, in some embodiments, comparator circuit 335 may convert current utilization 355 into a format appropriate for target utilization 365 (e.g., a percentage). In one embodiment the result may indicate a difference between current utilization 355 and target utilization 365. The result may indicate that a difference between current utilization 355 and target utilization 365 is within a specified range (e.g., current utilization 355 is at least 10% larger than target utilization 365, current utilization 355 and target utilization 365 are less than 10% of each other, or current utilization is at least 10% smaller than target utilization 365). In other embodiments, several ranges may be used (e.g., current utilization 355 is 10-20% larger target utilization 365, current utilization 355 is 21-30% larger target utilization 365, etc.). In still other embodiments, an output of comparator circuit 335 may indicate a number of "credits." As used here, the number of credits may indicate a specified amount of hardware resources allocated to the process per a specified number of execution cycles, as compared to an expected amount of hardware resources allocated to the process per the specified number of execution cycles.

Process priority adjustment circuit 340 may determine whether to adjust, via priority signal(s) 225A-M, a priority of one or more processes at one or more clusters based on the result from comparator circuit 335. In some cases, at least some of the one or more clusters where the priority is adjusted may be different from the cluster corresponding to current utilization 355. As noted above, the result may indicate that a difference between current utilization 355 and target utilization 365 is within a specified range (or outside a specified range). In response to the difference being within the specified range, process priority adjustment circuit 340 may determine not to adjust the priority of the process at one or more of the clusters. In some other embodiments, priority signal 225A may be sent to process priority list 320, indicating no adjustment to the priority should be made. In other embodiments, priority signal 225A may not be sent. In response to the result being outside the specified range and current utilization 355 being larger than target utilization 365, process priority adjustment circuit 340 may reduce the priority of the process at one or more clusters (e.g., via priority signal 225A). In response to the result being outside the specified range and current utilization 355 being smaller than target utilization 365, process priority adjustment circuit 340 may increase the priority of the process at one or more clusters (e.g., via priority signal 225A). The priority may be adjusted, for example, by a fixed amount or may be based on the difference between current utilization 355 and target utilization 365. In some cases, process priority adjustment circuit 340 may track a total difference for the process based on a plurality of outputs from comparator circuit 335 (e.g., multiple outputs corresponding to a single cluster, outputs corresponding to multiple clusters, or both). As noted above, in some embodiments, the results from comparator circuit 335 may indicate a number of credits. Process priority adjustment circuit 340 may track a total number of credits for a process. Additionally, process priority adjustment circuit 340 may adjust the priority of the process based on the total number of credits exceeding or falling below various specified thresholds. The adjusted priority may be used by hardware resource arbitration circuit 310 in future allocation cycles to reallocate hardware resources 305. As discussed above, in some embodiments the priority may be adjusted such that allocation of hardware resources 305 to processes at cluster 205A trends towards a specified ratio over a period of time (e.g., 1 millisecond or 1 second), as opposed to the allocation being the specified ratio. In still other embodiments, process priority adjustment circuit 340 may use additional information to adjust the priority. For example, process priority adjustment circuit 340 may receive results from comparator circuits corresponding to other processes (e.g., received at cluster 205A from other process queues than the process corresponding to director circuit 210A). As another example, process priority adjustment circuit 340 may save information from previous results provided by comparator circuit 335. As a third example, process priority adjustment circuit 340 may receive an indication of a number of hardware resources requested by the process at one or more of clusters 205. As noted above, in some cases, various processes may have specified ranges of priorities. The specified ranges may be based on the processes themselves (e.g., based on a process type), based on a priority requested by the process, based on a process queue from which the process was received, or based on other factors. The specified ranges may differ at different clusters. In light of these differences, process priority adjustment circuit 340 may adjust priorities based on the specified ranges such that the adjusted priorities are in the specified ranges.

In some cases, process priority adjustment circuit 340 may identify the process as being ill-behaved or hung. For example, in response to determining THE current utilization 355 for a first process exceeds target utilization 365, determining that the priority of the process is already the lowest priority that can be assigned, and determining that one or more other processes are receiving an insufficient number of resources, process priority adjustment circuit 340 may identify the first process as being ill-behaved. As another example, in response to determining that a second process is failing to utilize an allocated portion of hardware resources 305 despite being allocated a requested portion of hardware resources 305 for a particular amount of time, process priority adjustment circuit 340 may identify the second process as being hung. The process may be identified as ill-behaved or hung based on a difference between current utilization 355 and target utilization 365 exceeding one or more specified amounts. In various embodiments where credits are used, a process may be identified as being ill-behaved or hung in response to the number of credits exceeding or falling below respective specified thresholds. In some embodiments, in response to identifying A process as being ill-behaved or hung, process priority adjustment circuit 340 may indicate to one or more of clusters 205A-M that a context switch should occur for the process or that the process should be terminated. The indication may be sent via one or more of priority signal 225A-M (e.g., setting the priority to a particular value) or to one or more other devices (e.g., to hardware resource arbitration circuit 310 directly).

Figure 4:
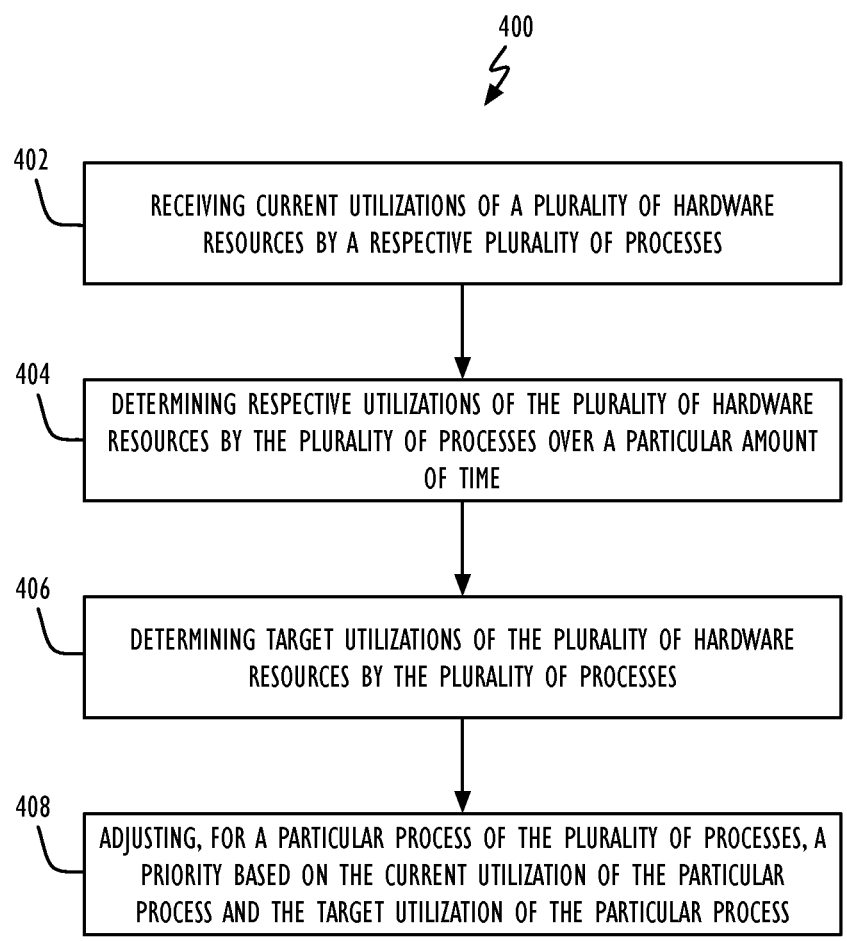
FIG. 4 is a flow diagram illustrating one embodiment of a method of allocating hardware resources of a processing circuit.

Referring now to FIG. 4, a flow diagram of operation 400 for allocating hardware resources of a processing circuit is depicted. In some embodiments, operation 400 may be initiated or performed by one or more processors in response to one or more instructions stored in a computer-readable storage medium. Operation 400 may initially receive current utilizations of a plurality of hardware resources by a respective plurality of processes (block 402). For example, operation 400 may include director circuits 210A-N of FIG. 2 receiving current utilizations of hardware resources (e.g., hardware resources 305 of FIG. 3) at clusters 205A-M. Operation 400 may also include determining respective utilizations of the plurality of hardware resources by the plurality of processes over a particular amount of time (block 404). For example, operation 400 may include director circuits 210A-N determining, via respective utilization accumulation circuits (e.g., utilization accumulation circuit 325) respective utilizations of the plurality of hardware resources by respective processes over a particular amount of time. Operation 400 may then determine target utilizations of the plurality of hardware resources by the plurality of processes (block 406). For example, operation 400 may include director circuits 210A-N determining, at respective target utilization circuits (e.g., target utilization circuit 330), respective utilizations of the plurality of hardware resources by respective processes over a particular amount of time. Based on these prior actions, operation 400 may then adjust, for a particular process of the plurality of processes, a priority based on the current utilization of the particular process and the target utilization of the particular process (block 408). For example, operation 400 may include process priority adjustment circuit 340 adjusting, via priority signal 225A, a processes priority at process priority list 320 based on current utilization 355 and target utilization 365. The adjusted priorities may be used to reallocate the hardware resources.

In accordance with a slightly more detailed example of a computational hardware resource allocation system in accordance with this disclosure, a "data master" represents a hardware entity that acts as the interface for executing software to submit work to a graphics processor. There may be multiple types of data masters within a single system. There could also be multiple instances of the same type of data master associated with a single graphics processor. In tile based deferred rendering (TBDR) GPU architectures, for example, where graphics rendering may be divided into geometry and pixel phases, there may be one or more vertex data masters, one or more pixel data masters and one or more compute data masters. In immediate mode rendering GPU architectures, where graphics rendering may be grouped by draw commands, different data masters may be used for different objects (wherein each object is responsible for processing its own vertex and pixel data). As such, data masters may be considered heterogeneous in the sense each type of data master can have different characteristics for acquiring resources and being dispatched to a graphics processor.

Figure 5:
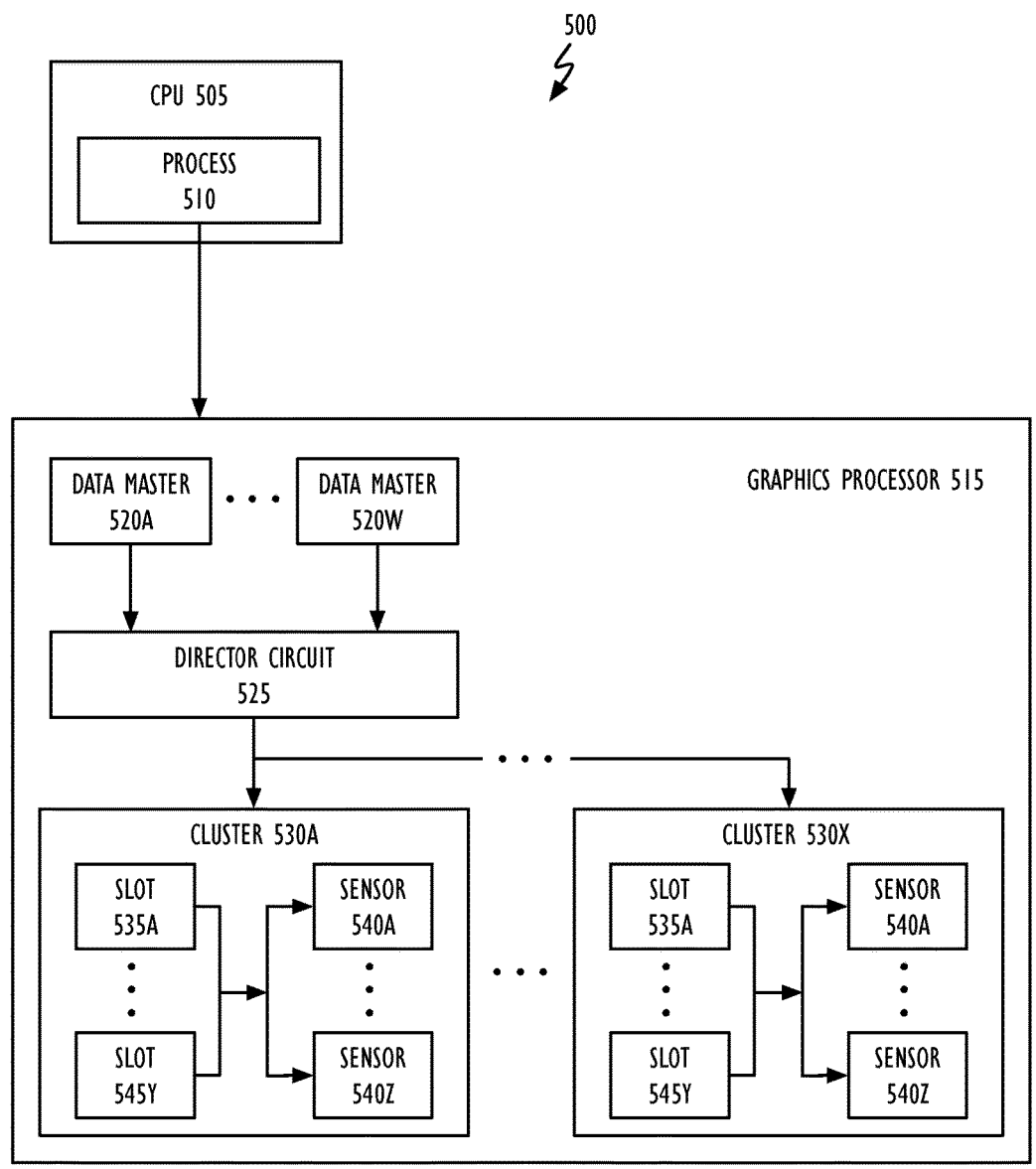
FIG. 5 is a block diagram illustrating another embodiment of a processing circuit hardware resource allocation system.

Referring to FIG. 5, in one particular embodiment hardware resource allocation system 500 includes CPU 505 (on which process 510 executes) and graphics processor 515. Graphics processor 515 includes data mater units 520A-W, director circuit 525 and clusters 530A-X. Each cluster further includes hardware resources organized into "slots" 535A-Y and hardware resource utilization sensors 540A-Z. As previously noted, illustrative hardware resources 535A-Y include, but are not limited to, universal shaders, vertex shaders, fragment shaders, computational units, registers, and the like. Each of slots 540A-Y represent a portion of a cluster's resources. At run-time, process 510 may issue a series of commands to graphics processor 515 that are received at data masters 520A-W. Data masters 520A-W may break these commands into kicks and submit them to one or more director circuits (e.g., director circuit 525). As used herein, a "kick" represents a minimum granularity of work that can be submitted to a graphics processor (e.g., processor 515). That is, software applications may only submit work in terms of discrete units or kicks. Director circuit 525 ensures that each kick is allocated a specified amount of cluster resources (e.g., in units of slots 535A-Y) in accordance with their initial priority as discussed above with respect to FIG. 3. By way of example, if a pixel or fragment kick covered a 1024×1024 resolution screen ($2^{10} \times 2^{10}$), there will be $2^{20}$ or 1M pixels that need to be processed for this kick to complete. If this kick were assigned to a single cluster having 32 ($2^5$) slots with each slot having 64 ($2^6$) pixel/fragment shaders, a total of 512 slots would be required for this kick to complete ($512=2^{20} \div (2^5 \times 2^6) = 2^{20} \div 2^{11}$). In one embodiment, each hardware resource utilization sensor may be used to track the utilization of a single (unique) kick on its corresponding cluster. That is, if a cluster (e.g., cluster 530A) could only execute a single kick at a time, only one hardware resource utilization sensor (e.g., sensor 535A) may be needed for that cluster (e.g., 530A). If a cluster (e.g., cluster 530B) could execute 'J' unique kicks at a time, 'J' hardware resource utilization sensors (e.g., sensors 535A-J) would be needed for the cluster (e.g., 530B). In the limit, there may be as many different kicks executing on a cluster as the cluster has slots.

In one or more embodiments, processing circuit hardware resource allocation system 500 may be used to monitor and control, in real-time, a processes quality of service (QoS). As used here, "real-time" means during graphics processor operations involving the process whose QoS is being measured and controlled. The concept of Quality of Service (QoS) as it applies to a hardware resource allocation system disclosed above may be directed to ensuring that each unit of work (e.g., a kick) sent to a graphics processor receives a predetermined amount of resources during its execution. This same concept may be applied to a related group or collection of kicks (e.g., as generated by process 510 executing on CPU 505); referred to herein as a process QoS metric. In this latter case, QoS refers to a processes ability to obtain and utilize a predetermined amount of resources during its execution. A processes ability to utilize its allocated hardware resources, in turn, may be described in terms of its utilization of those allocated resources on a kick-by-kick basis. In still other embodiments, QoS could refer to the effective resource utilization of a group or collection of processes.

Figure 6A:
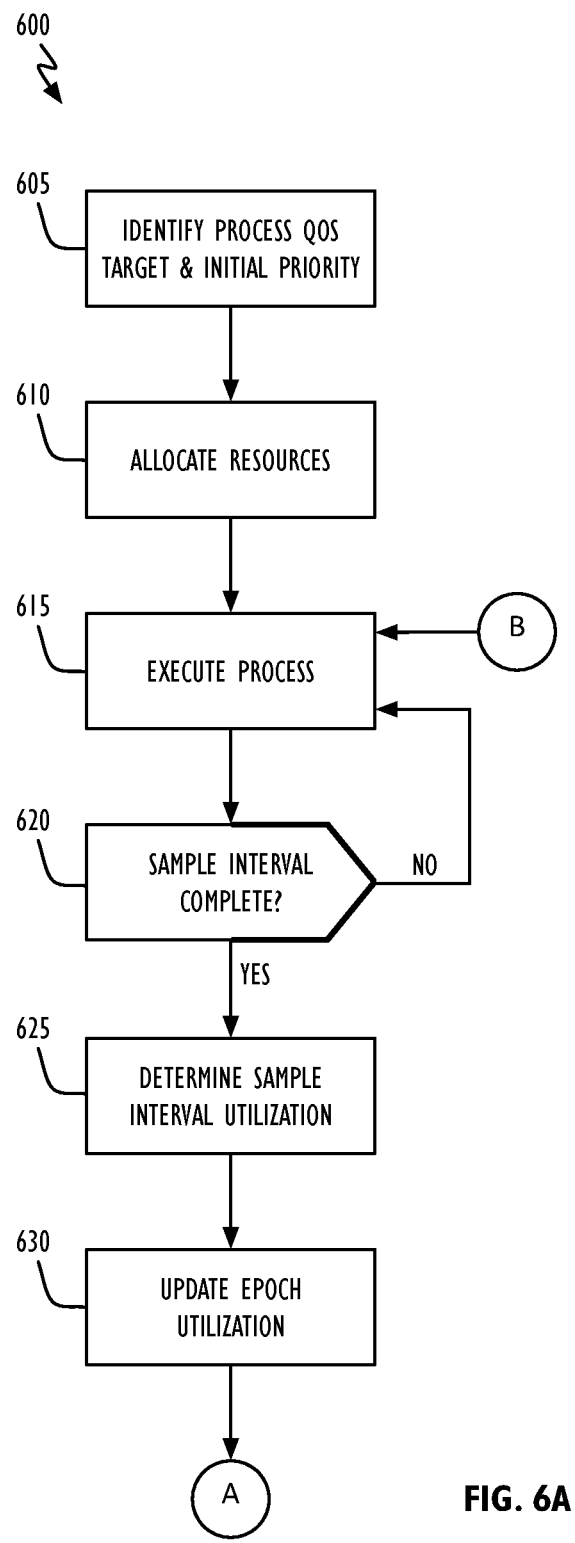
FIGS. 6A and 6B are flowcharts illustrating one embodiment in accordance with this disclosure.

Referring to FIG. 6A, process QoS operation 600 may begin when, prior to its initial execution, a processes QoS target and initial priority are determined (block 605). In one embodiment a processes initial priority may be specified by the operating process itself (e.g., process 510). In another embodiment, the processes initial priority may be based on, as described above, a priority requested by the processes process queue. In still another embodiment the initial priority may be based on the type of process (e.g., a user interface process or a compute only process). In yet another embodiment the initial priority may be based on the process queue from which the process comes (see discussion above regarding FIG. 3). Resources commensurate with the determined process priority may be allocated (block 610), where after the process may begin execution (block 615). As described above with respect to FIGS. 2, 3 and 5, initial resource allocation may be made by the combined operation of hardware resource arbitration circuit 310 and process priority list 320.

In one or more embodiments, a processes measured utilization may be based on a relatively long time interval (e.g., an epoch interval) which itself is comprised of a number of shorter measurement or sample intervals. By way of example, a sample interval may be between 10 and 100 GPU clock cycles whereas the corresponding epoch interval may be between 500 and 10,000 GPU clock cycles. For a 1 gigahertz (GHz) GPU clock, this means a sample interval between approximately 10 nanoseconds (nsec) and 100 nsec and an epoch interval between approximately 500 nsec and 10 microseconds (isec). Sample and epoch intervals may be determined by a hardware clock/counter and/or a software counter/timer. It should be understood that for the purposes of QoS measurements, it may be desirable to keep these intervals tightly controlled. This, in turn, argues for use of a hardware clock/counter mechanism. Having noted this, these intervals are solely for illustrative purposes and should not, in any way, be considered limiting. If at a given time the current kick has not yet executed for a sample interval's worth of time (the "NO" prong of block 620), operation 600 continues at block 615; that is, the current kick continues executing. When the current kick has executed for a sample interval's amount of time (the "YES" prong of block 620), the kick's sample interval utilization may be determined (block 625). As noted above, a sample interval's kick utilization could be a value returned by the kick's corresponding hardware resource utilization sensor 315. The sample interval utilization may then be used to update the current epoch interval's utilization value (block 630) before continuing to block 635 in FIG. 6B via node 'A'. Operations in accordance with block 630 may include, for example, keeping track of the resources used by concurrently executing kicks—those kicks not related to, or generated by, the process whose QoS is being determined in accordance with FIG. 6.

Figure 6B:
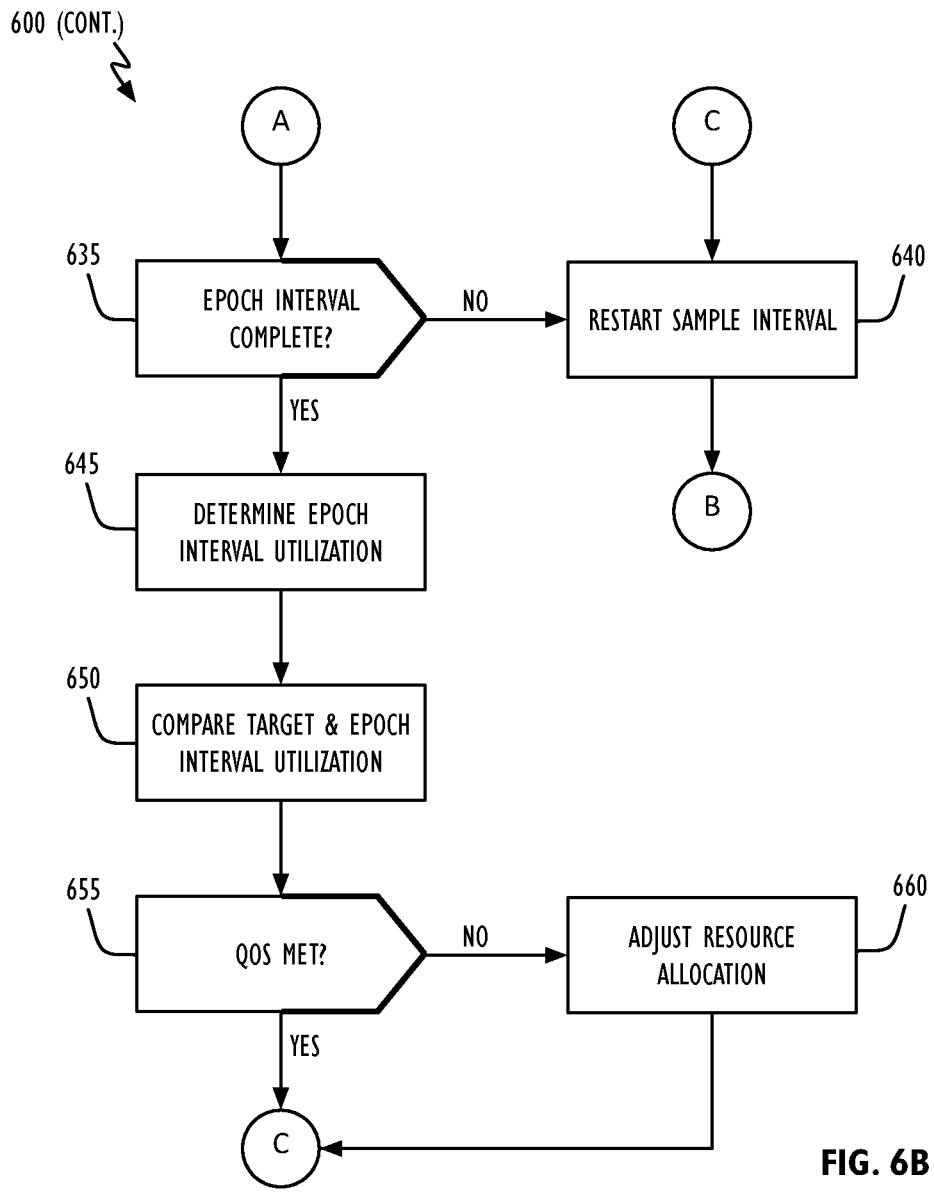

Referring to FIG. 6B, if the current epoch interval is not yet over (the "NO" prong of block 635), the sample interval may be reset or restarted (block 640), where after operation 600 continues at block 615 in FIG. 6A via node 'B'. If the current epoch interval is complete (the "YES" prong of block 635), the current epoch's utilization may be determined (block 645). In one embodiment, a software entity could track and accumulate each of its kick's utilization factors to determine its overall utilization or QoS (e.g., process 510). In another embodiment, hardware at the director (e.g., director 525) or data master (e.g., components 520A-W) level may provide this functionality. Epoch interval utilization values in accordance with block 645 may be "normalized." As used herein, normalized epoch utilization values are utilization values that have been adjusted to account for resources used by concurrently executing kicks. In one embodiment, this may be described mathematically as follows:

$$QoS(A) = \frac{\sum_{i=1}^{J} A_i}{\sum_{i=1}^{J} A_i + \sum_{i=1}^{J} B_i + \sum_{i=1}^{J} C_i + \ldots}, \qquad \text{EQ. 1}$$

where QoS(A) represents the measured QoS value for process 'A', 'J' represents the number of sample intervals within the epoch, and $A_i$, $B_i$ and $C_i$ represent the utilization values of other kicks executing concurrently with the kicks corresponding to process A. In practice any normalization technique may be used as long as it has relevance to the task being solved, EQ. 1 represents but one way to do this. Once determined, the epoch's measured QoS value may be compared with a target QoS value (block 650); as obtained in accordance with block 605 in FIG. 6A. If the run-time measured QoS value meets THE target value (the "YES" prong of block 655), processing continues at block 640 via node 'C'. If the run-time measured QoS value does not meet the target value (the "NO" prong of block 655), the processes priority value may be adjusted (block 660), where after processing continues at block 640 via node 'C'. By way of example, if a processes measured QoS value does not meet a target QoS value, the priority of all kicks subsequently issued by that process may have their priority increased as discussed above with respect to FIG. 3. In one embodiment, processes determined in accordance with FIG. 6 to have a higher measured QoS value than initially specified by the processes corresponding QoS target value, may have their later issued kicks' priority decreased. In another embodiment, processes determined in accordance with FIG. 6 to have a higher measured QoS value than initially specified by the corresponding QoS target value, may issue subsequent kicks at their currently assigned priority (i.e., the priority level used in the immediately prior epoch interval).

As noted briefly above, because different data masters have different characteristics of acquiring resources and dispatching their kicks to the graphics processor, they may be considered heterogeneous. A side-effect of this is that regardless of what priority a data master assigns to a kick (e.g., data master 520A), the director component to which that kick is assigned (e.g., director 525) may grant a lower priority kick from a different data master more resources (e.g., data master 520W). The phenomenon of lower priority kicks being allocated more resources than higher priority kicks is referred to herein as "sneaking." Sneaking is a side effect of arbitrating graphics processor resources across or through heterogeneous data masters.

For illustrative purposes only, assume a director is capable of arbitrating and granting resources to one data master every graphics processor clock cycle whenever a slot is available. Consider a first data master that issues high priority kicks at a low rate from a shallow queue. Consider next a second data master that issues lower priority kicks at a higher rate and which requires a block grant of a cluster's slots. In such cases, when slots becomes available even if a high priority kick from the first data master was able to claim the first slots offered, it could soon run out of work to fill subsequently available slots due to its low rate of production and shallow queue. When there is no contention for taking the slots, the data master issuing the lower priority kicks will claim the available slots and lock out the first (higher priority) data master due to the block grant.

Figure 7:
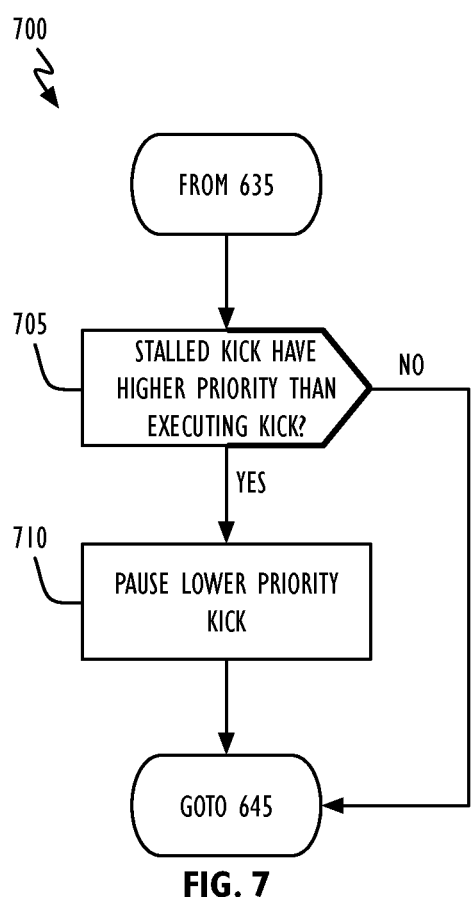
FIG. 7 is a flowchart illustrating another embodiment in accordance with this disclosure.

Referring to FIG. 7, pause operation 700 in accordance with one or more embodiments may be employed after each epoch period to avoid or stifle sneaking. As shown, a check may be made to determine if there are stalled kicks (block 705). As used here, a "stalled" kick is a kick that is waiting for resources and has a higher priority than an executing kick. If there are no stalled kicks (the "NO" prong of block 705), pause operation 700 continues at block 645 in FIG. 6B. If there is a stalled kick (the "YES" prong of block 705), one or more lower priority kicks having the resources needed by the stalled higher priority kick may be paused (block 710), where after pause operation 700 continues at block 645 in FIG. 6B. (See discussion above as to when the "pause" operation may be released.) In one embodiment, once a slot has been assigned to a kick it needs to continue to execute to completion (e.g., to the end of a sample interval or an epoch interval). In other embodiments, this restriction may not limit when kicks can be assigned. It should be noted that while pause operation 700 has been shown as occurring between blocks 635 and 645 (see FIG. 6B), it could also occur, for example, between blocks 645-650 or between blocks 650-655. Similarly, pause operation 700 could be performed after each sample interval. By way of example, in one or more embodiments pause operation 700 could be placed between blocks 620-625 or between blocks 625-630, or between blocks 630-635. One of ordinary skill in the art will recognize that pause operation 700 could also be placed in other locations within QoS operation 600.

Figure 8:
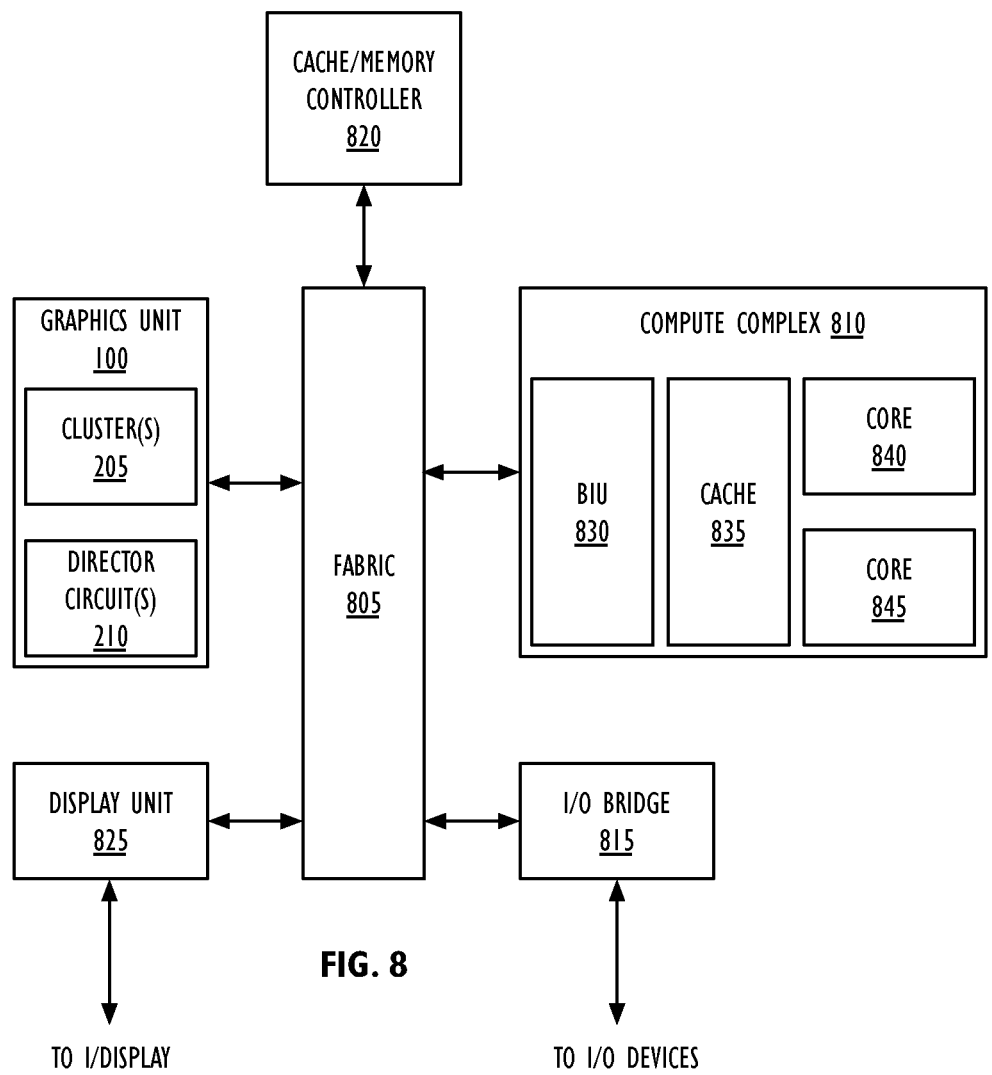
FIG. 8 is block diagram illustrating an embodiment of a computing system that includes at least a portion of a processing circuit hardware resource allocation system.

Turning next to FIG. 8, a block diagram illustrating an exemplary embodiment of a computing system 800 that includes at least a portion of a processing circuit hardware resource allocation system. The computing system 800 includes graphics unit 100 of FIG. 1. In some embodiments, graphics unit 100 includes one or more of the circuits described above with reference to FIG. 1, including any variations or modifications described previously with reference to FIGS. 1-7. For example, in the illustrated embodiment, graphics unit 100 includes cluster(s) 205 and director circuit(s) 210 of FIGS. 2 and 3. In some embodiments, some or all elements of the computing system 800 may be included within a system on a chip (SoC). In other embodiments, computing system 800 may be included in a mobile device. Accordingly, in at least some embodiments, area and power consumption of the computing system 800 may be important design considerations. In the illustrated embodiment, the computing system 800 includes communication's fabric 805, graphics unit 100, compute complex 810, input/output (I/O) bridge 815, cache/memory controller 820, and display unit 825. Although the computing system 800 illustrates graphics unit 100 as being connected to fabric 805 as a separate device of computing system 800, in other embodiments, graphics unit 100 may be connected to or included in other components of the computing system 800. Additionally, the computing system 800 may include multiple graphics units 100. The multiple graphics units 100 may correspond to different embodiments or to the same embodiment. Further, although in the illustrated embodiment, cluster circuit(s) 205 and director circuit(s) 210 are part of graphics unit 100, in other embodiments, cluster(s) 205, director circuit(s) 210, or both may be a separate device or may be included in other components of computing system 800. Fabric 805 may include various interconnects, buses, MUXes, controllers, etc., and may be configured to facilitate communication between various elements of computing system 800. In some embodiments, portions of fabric 805 are configured to implement various different communication protocols. In other embodiments, fabric 805 implements a single communication protocol and elements coupled to fabric 805 may convert from the single communication protocol to other communication protocols internally. In the illustrated embodiment, compute complex 810 includes bus interface unit (BIU) 830, cache 835, and cores 840 and 845. In some embodiments, cores 840 and 845 may correspond to execution units of clusters 205A-M. In various embodiments, compute complex 810 includes various numbers of cores and/or caches. For example, compute complex 810 may include 1, 2, or 4 processor cores, or any other suitable number. In some embodiments, cores 840 and/or 845 include internal instruction and/or data caches. In some embodiments, a coherency unit (not shown) in fabric 805, cache 835, or elsewhere in computing system 800 is configured to maintain coherency between various caches of computing system 800. BIU 830 may be configured to manage communication between compute complex 810 and other elements of computing system 800. Processor cores such as cores 840 and 845 may be configured to execute instructions of a particular instruction set architecture (ISA), which may include operating system instructions and user application instructions. I/O bridge 815 may include various elements configured to implement: universal serial bus (USB) communications, security, audio, and/or low-power always-on functionality, for example. I/O bridge 815 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 800 via I/O bridge 815. In some embodiments, graphics unit 100 may be coupled to computing system 800 via I/O bridge 815. Cache/memory controller 820 may be configured to manage the transfer of data between fabric 805 and one or more caches and/or memories (e.g., non-transitory computer readable mediums). For example, cache/memory controller 820 may be coupled to an L3 cache, which may, in turn, be coupled to a system memory. In other embodiments, cache/memory controller 820 is directly coupled to a memory. In some embodiments, the cache/memory controller 820 includes one or more internal caches. In some embodiments, the cache/memory controller 820 may include or be coupled to one or more caches and/or memories that include instructions that, when executed by one or more processors (e.g., compute complex 810 and/or graphics unit 100), cause the processor, processors, or cores to initiate or perform some or all of the operations described above with reference to FIGS. 1-8 or below with reference to FIG. 9. Display unit 825 may be configured to read data from a frame buffer and provide a stream of pixel values for display. Display unit 825 may be configured as a display pipeline in some embodiments. Additionally, display unit 825 may be configured to blend multiple frames to produce an output frame. Further, display unit 825 may include one or more interfaces (e.g., MIPI or embedded display port, eDP) for coupling to a user display (e.g., a touchscreen or an external display).

As used herein, the term "coupled to" may indicate one or more connections between elements, and a coupling may include intervening elements. For example, in FIG. 8, display unit 825 may be described as "coupled to" compute complex 810 through fabric 805. In contrast, in the illustrated embodiment of FIG. 8, display unit 825 is "directly coupled" to fabric 805 because there are no intervening elements.

Graphics unit 100 may include one or more processors and/or one or more graphics processing units (GPU's). Graphics unit 100 may receive graphics-oriented instructions, such as OPENGL®, Metal®, or DIRECT3D® instructions, for example. (OPENGL is a registered trademark of the Silicon Graphics International Corporation. METAL is a registered trademark of Apple Inc. DIRECT3D is a registered trademark of the Microsoft Corporation.) Graphics unit 100 may execute specialized GPU instructions or perform other operations based on the received graphics-oriented instructions. Graphics unit 100 may generally be configured to process large blocks of data in parallel and may build images in a frame buffer for output to a display. Graphics unit 100 may include transform, lighting, triangle, and/or rendering engines in one or more graphics processing pipelines, which may correspond to process queues 200A-K. Graphics unit 100 may output pixel information for display images. In the illustrated embodiment, graphics unit 100 includes programmable shader 115.

Figure 9:
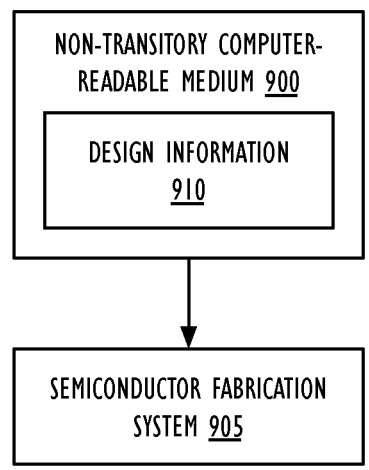
FIG. 9 is a block diagram illustrating one embodiment of a process of fabricating at least a portion of a processing circuit hardware resource allocation system.
Figure 9:
Figure 9:
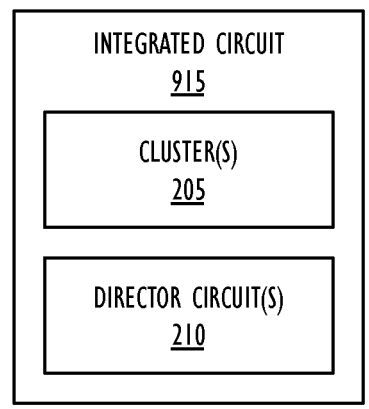

FIG. 9 is a block diagram illustrating a process of fabricating at least a portion of a processing circuit hardware resource allocation system. FIG. 9 includes a non-transitory computer-readable medium 900 and a semiconductor fabrication system 905. Non-transitory computer-readable medium 900 includes design information 910. FIG. 9 also illustrates a resulting fabricated integrated circuit 915. In the illustrated embodiment, integrated circuit 915 includes cluster(s) 205 and director circuit(s) 210 of FIGS. 2 and 3. However, in other embodiments, integrated circuit 915 may only include one of cluster(s) 205 or director circuit(s) 210. In some embodiments, integrated circuit 915 may include a subset of cluster(s) 205, director circuit(s) 210, or both. In the illustrated embodiment, semiconductor fabrication system 905 is configured to process design information 910 stored on non-transitory computer-readable medium 900 and fabricate integrated circuit 915. Non-transitory computer-readable medium 900 may include any of various appropriate types of memory devices or storage devices. For example, non-transitory computer-readable medium 900 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 900 may include two or more memory mediums, which may reside in different locations (e.g., in different computer systems that are connected over a network). Semiconductor fabrication system 905 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 905 may also be configured to perform various testing of fabricated circuits for correct operation. Design information 910 may be specified using any of various appropriate computer languages, including hardware description languages such as, without limitation: VHDL, Verilog, SystemC, SystemVerilog, RHDL, M, MyHDL, etc. Design information 910 may be usable by semiconductor fabrication system 905 to fabricate at least a portion of integrated circuit 915. The format of design information 910 may be recognized by at least one semiconductor fabrication system 905. In some embodiments, design information 910 may also include one or more cell libraries, which specify the synthesis and/or layout of integrated circuit 915. In some embodiments, the design information is specified in whole or in part in the form of a netlist that specifies cell library elements and their connectivity. Design information 910, taken alone, may or may not include sufficient information for fabrication of a corresponding integrated circuit (e.g., integrated circuit 915). For example, design information 910 may specify circuit elements to be fabricated but not their physical layout. In this case, design information 910 may be combined with layout information to fabricate the specified integrated circuit. In various embodiments, integrated circuit 915 is configured to operate according to a circuit design specified by design information 910, which may include performing any of the functionality described herein. For example, integrated circuit 915 may include any of various elements described with reference to FIGS. 1-5 and 8. Further, integrated circuit 915 may be configured to perform various functions described herein in conjunction with other components. The functionality described herein may be performed by multiple connected integrated circuits. As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 915 is performed. Design information 910 may be generated using one or more computer systems and stored in non-transitory computer-readable medium 900. The method may conclude when design information 910 is sent to semiconductor fabrication system 905 or prior to design information 910 being sent to semiconductor fabrication system 905. Accordingly, in some embodiments, the method may not include actions performed by semiconductor fabrication system 905. Design information 910 may be sent to fabrication system 9005 in a variety of ways. For example, design information 910 may be transmitted (e.g., via a transmission medium such as the Internet) from non-transitory computer-readable medium 900 to semiconductor fabrication system 905 (e.g., directly or indirectly). As another example, non-transitory computer-readable medium 900 may be sent to semiconductor fabrication system 905. In response to the method of initiating fabrication, semiconductor fabrication system 905 may fabricate integrated circuit 915 as discussed above.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 4, 6-7 and 9 or the arrangement of elements shown in FIGS. 1-3, 5 and 8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A graphics processing unit (GPU) hardware utilization method, comprising:
    measuring, for a first process, a first utilization value for first hardware resources after each of a first plurality of sample time intervals, wherein each first utilization value is indicative of the first process' use of the first hardware resources during each respective sample time interval of the first plurality of sample time intervals;
    measuring, for at least one second process executed concurrently with the first process, a second utilization value for second hardware resources after each of the first plurality of sample time intervals, wherein each second utilization value is indicative of the at least one second process' use of the second hardware resources during each respective sample time interval of the first plurality of sample time intervals;
    combining, after the first plurality of sample time intervals, the first utilization values to generate a first combined utilization value for the first process;
    combining, after the first plurality of sample time intervals, the second utilization values for each of the at least one second processes to generate a second combined utilization value for each of the at least one second processes;
    normalizing the first combined utilization value, by dividing the first combined utilization value by the sum of the first combined utilization value and each of the at least one second combined utilization values, to generate a normalized first utilization value;
    comparing the normalized first utilization value to a target value and modifying a first priority of the first process based on results of said comparing; and
    allocating hardware resources from the second hardware resources to the first process based on the modified first priority.

2. The method of claim 1, wherein measuring a first utilization value comprises:
    obtaining, at the end of each respective sample time interval of the first plurality of sample time intervals, an output value from a hardware resource utilization sensor logically coupled to the first hardware resources.

3. The method of claim 2, wherein measuring a second utilization value comprises, for each of the at least one second processes:
    obtaining, at the end of each respective sample time interval of the first plurality of sample time intervals, output from a hardware resource utilization sensor logically coupled and unique to the second hardware resources.

4. The method of claim 1, further comprising:
    determining a third process has a higher priority than the first process, the third process blocked by execution of the first process;
    pausing the first process in response to determining the third process has the higher priority than the first process;
    releasing the first hardware resources from the first process congruent with pausing the first process;
    allocating third hardware resources to the third process, wherein the third hardware resources include at least some of first hardware resources;
    executing the third process after allocating it the third hardware resources; and
    measuring, for the third process, a third utilization value for the third hardware resources after each of a second plurality of sample time intervals, wherein each third utilization value is indicative of the third process' use of the third hardware resources during each respective sample time interval of the second plurality of sample time intervals.

5. The method of claim 4, further comprising combining, after the second plurality of sample time intervals, the third utilization values to generate a third combined utilization value for the third process.

6. The method of claim 5, further comprising normalizing the third combined utilization value, by dividing the third combined utilization value by the sum of the third combined utilization value and each of the at least one second combined utilization values, to generate a normalized third utilization value.

7. A non-transitory program storage device comprising instructions stored thereon to cause one or more processors to:
    measure, for a first process executing on a graphics processor, a first utilization value for first hardware resources of the graphics processor after each of a first plurality of sample time intervals, wherein each first utilization value is indicative of the first process' use of the first hardware resources during each respective sample time interval of the first plurality of sample time intervals;
    measure, for at least one second process executed concurrently with the first process, a second utilization value for second hardware resources of the graphics processor after each of the first plurality of sample time intervals, wherein each second utilization value is indicative of the at least one second process' use of the second hardware resources during each respective sample time interval of the first plurality of sample time intervals;

combine, after the first plurality of sample time intervals, the first utilization values to generate a first combined utilization value for the first process;

combine, after the first plurality of sample time intervals, the second utilization values for each of the at least one second processes to generate a second combined utilization value for each of the at least one second processes;

normalize the first combined utilization value, by dividing the first combined utilization value by the sum of the first combined utilization value and each of the at least one second combined utilization values, to generate a normalized first utilization value;

compare the normalized first utilization value to a target value and modify a first priority of the first process based on results of the comparison; and allocate hardware resources of the second hardware resources of the graphics processor to the first process based on the modified first priority.

8. The non-transitory program storage device of claim 7, wherein the instructions to measure a first utilization value comprise instructions to:

obtain, at the end of each respective sample time interval of the first plurality of sample time intervals, an output value from a hardware resource utilization sensor logically coupled to the first hardware resources.

9. The non-transitory program storage device of claim 8, wherein the instructions to measure a second utilization value comprise instructions to, for each of the at least one second processes:

obtain, at the end of each respective sample time interval of the first plurality of sample time intervals, output from a unique hardware resource utilization sensor logically coupled to the second hardware resources.

10. The non-transitory program storage device of claim 7, further comprising instructions to cause the one or more processors to:

determine a third process has a higher priority than the first process, the third process blocked by execution of the first process;

pause the first process in response to determining the third process has the higher priority than the first process;

release the first hardware resources from the first process congruent with pausing the first process;

allocate third hardware resources to the third process, wherein the third hardware resources include at least some of first hardware resources;

execute the third process after allocating it the third hardware resources; and measure, for the third process, a third utilization value for the third hardware resources after each of a second plurality of sample time intervals, wherein each third utilization value is indicative of the third process' use of the third hardware resources during each respective sample time interval of the second plurality of sample time intervals.

11. The non-transitory program storage device of claim 10, further comprising instructions to cause the one or more processors to combine, after the second plurality of sample time intervals, the third utilization values to generate a third combined utilization value for the third process.

12. The non-transitory program storage device of claim 11, further comprising instructions to cause the one or more processor to normalize the third combined utilization value by dividing the third combined utilization value by the sum of the third combined utilization value and each of the at least one second combined utilization values, to generate a normalized third utilization value.

13. An electronic device, comprising:

at graphics processing unit (GPU) having first and second hardware resources;

at central processing unit (CPU) operatively coupled to the GPU;

memory operatively couple to the CPU and the GPU;

means for measuring, for a first process executing on the GPU, a first utilization value for the first hardware resources of the GPU after each of a first plurality of sample time intervals, wherein each first utilization value is indicative of the first process' use of the first hardware resources during each respective sample time interval of the first plurality of sample time intervals;

means for measuring, for at least one second process executing on the GPU executed concurrently with the first process, a second utilization value for the second hardware resources of the GPU after each of the first plurality of sample time intervals, wherein each second utilization value is indicative of the at least one second process' use of the second hardware resources during each respective sample time interval of the first plurality of sample time intervals;

means for combining, after the first plurality of sample time intervals, the first utilization values to generate a first combined utilization value for the first process;

means for combining, after the first plurality of sample time intervals, the second utilization values for each of the at least one second processes to generate a second combined utilization value for each of the at least one second processes;

means for normalizing the first combined utilization value, by dividing the first combined utilization value by the sum of the first combined utilization value and each of the at least one second combined utilization values, to generate a normalized first utilization value;

means for comparing the normalized first utilization value to a target value and means for modifying a first priority of the first process based on results of said comparing; and means for allocating hardware resources of the second hardware resources of the graphics processor to the first process based on the modified first priority.

14. The electronic device of claim 13, wherein the means for measuring a first utilization value comprise a means for obtaining, at the end of each respective sample time interval of the first plurality of sample time intervals, an output value from a hardware resource utilization sensor of the GPU, wherein the hardware resource utilization sensor of the GPU is configured to track use of the first hardware resources.

15. The electronic device of claim 14, wherein the means for measuring a second utilization value comprise a means for obtaining, for each of the at least one second processes and at the end of each respective sample time interval of the first plurality of sample time intervals, output from a hardware resource utilization sensor configured to track use of the second hardware resources.

16. The electronic device of claim 13, further comprising:

a means for determining a third process executing on the GPU has a higher priority than the first process, the third process blocked by execution of the first process;

a means for pausing the first process in response to having determined the third process has the higher priority than the first process;

a means for releasing the first hardware resources from the first process congruent with pausing the first process;

a means for allocating third hardware resources of the GPU to the third process, wherein the third hardware resources include at least some of first hardware resources;

a means for executing the third process after allocating it the third hardware resources; and a means for measuring, for the third process, a third utilization value for the third hardware resources after each of a second plurality of sample time intervals, wherein each third utilization value is indicative of the third process' use of the third hardware resources during each respective sample time interval of the second plurality of sample time intervals.

17. The electronic device of claim 16, further comprising a means for combining, after the second plurality of sample time intervals, the third utilization values to generate a third combined utilization value for the third process.

18. The electronic device of claim 17, further comprising a means for normalizing the third combined utilization value by dividing the third combined utilization value by the sum of the third combined utilization value and each of the at least one second combined utilization values, to generate a normalized third utilization value.

* * * * *